(12) United States Patent
Kinouchi et al.

(10) Patent No.: US 10,000,628 B2
(45) Date of Patent: Jun. 19, 2018

(54) POLYARYLENE SULFIDE RESIN COMPOSITION AND USE OF SAME

(71) Applicant: LION IDEMITSU COMPOSITES CO., LTD., Tokyo (JP)

(72) Inventors: Satoru Kinouchi, Chiba (JP); Naoto Okubo, Chiba (JP)

(73) Assignee: LION IDEMITSU COMPOSITES CO., LTD., Tokyo (JP)

( * ) Notice: Subject to any disclaimer, the term of this patent is extended or adjusted under 35 U.S.C. 154(b) by 0 days. days.

(21) Appl. No.: 14/779,691

(22) PCT Filed: Mar. 28, 2014

(86) PCT No.: PCT/JP2014/059339
§ 371 (c)(1),
(2) Date: Sep. 24, 2015

(87) PCT Pub. No.: WO2014/157694
PCT Pub. Date: Oct. 2, 2014

(65) Prior Publication Data
US 2016/0032085 A1    Feb. 4, 2016

(30) Foreign Application Priority Data
Mar. 29, 2013    (JP) .................................. 2013-075271

(51) Int. Cl.
 C08K 9/06    (2006.01)
 G02B 6/38    (2006.01)
 C08L 81/04    (2006.01)
 C08K 7/20    (2006.01)

(52) U.S. Cl.
 CPC .............. *C08K 9/06* (2013.01); *G02B 6/3854* (2013.01); *G02B 6/3865* (2013.01); *G02B 6/3885* (2013.01); *C08K 7/20* (2013.01); *C08L 81/04* (2013.01)

(58) Field of Classification Search
 CPC .............. C08K 9/06; C08K 7/20; C08L 81/04
 See application file for complete search history.

(56) References Cited

U.S. PATENT DOCUMENTS

| | | | | |
|---|---|---|---|---|
| 4,337,182 A | | 6/1982 | Needham | |
| 4,703,074 A | * | 10/1987 | Izutsu ...................... | C08K 3/34 524/262 |
| 4,805,064 A | * | 2/1989 | Beer ......................... | H01C 7/12 338/21 |
| 4,885,321 A | * | 12/1989 | Nitoh ....................... | C08K 7/26 521/54 |
| 5,354,611 A | * | 10/1994 | Arthur ..................... | C08K 7/28 264/211 |
| 5,384,391 A | * | 1/1995 | Miyata .................... | C08G 75/0204 528/377 |
| 5,604,287 A | * | 2/1997 | Yamao ..................... | C08K 3/36 524/493 |
| 5,610,219 A | * | 3/1997 | Takatani .................. | C08K 7/02 385/100 |
| 5,849,055 A | * | 12/1998 | Arai ......................... | B01J 2/04 264/15 |
| 6,395,818 B1 | * | 5/2002 | Murakami ............... | C08K 3/36 524/492 |
| 9,249,283 B2 | * | 2/2016 | Heikkila .................. | B60C 1/00 |
| 2002/0004111 A1 | * | 1/2002 | Matsubara .............. | C03C 3/083 428/34.4 |
| 2005/0154087 A1 | * | 7/2005 | Kobayashi ............... | C08K 3/40 523/219 |
| 2010/0160527 A1 | * | 6/2010 | Royer ...................... | C08K 7/18 524/450 |
| 2010/0292067 A1 | * | 11/2010 | Nakamura ............... | B29B 7/90 501/32 |
| 2013/0156381 A1 | * | 6/2013 | Kadar-Kallen ......... | G02B 6/325 385/78 |

FOREIGN PATENT DOCUMENTS

| | | |
|---|---|---|
| JP | 57-158256 A | 9/1982 |
| JP | 03-220269 A | 9/1991 |
| JP | 03-229763 A | 10/1991 |
| JP | 2000273304 A | 10/2000 |

(Continued)

OTHER PUBLICATIONS

International Search Report from PCT Application No. PCT/JP2014/059339 dated Jun. 17, 2014.

(Continued)

*Primary Examiner* — Margaret Moore
(74) *Attorney, Agent, or Firm* — Millen, White, Zelano & Branigan, P.C.

(57) ABSTRACT

Provided is a polyarylene sulfide resin composition which is good in strength, dimensional stability, and moldability in terms of a molded body thereof and is also capable of reducing wearing of a mold or molding machine at the time of molding of a molded body. The polyarylene sulfide resin composition contains 100 parts by mass of a polyarylene sulfide resin and 150 to 400 parts by mass of a glass bead, a sodium content of the polyarylene sulfide resin being 1,200 ppm or less, and the glass bead being surface-treated with a vinylsilane or an epoxysilane and having an average particle diameter of 30 μm or less and a ratio between a cumulative 10% particle diameter and a cumulative 90% particle diameter {(cumulative 90% particle diameter)/(cumulative 10% particle diameter)} of 2.5 or more.

18 Claims, 1 Drawing Sheet

(56) References Cited

FOREIGN PATENT DOCUMENTS

| | | | |
|---|---|---|---|
| JP | 2002097372 | A | 4/2002 |
| JP | 2008127532 | A | 6/2008 |
| JP | 2009-263635 | A | 11/2009 |
| JP | 2012036281 | A | 2/2012 |

OTHER PUBLICATIONS

Japanese Office Action dated Jun. 28, 2016, issued in corresponding Japanese Application No. 2013-075271, 3 pages.
English translation Abstract of JP2009-263635A published Nov. 12, 2009 (1 page).

* cited by examiner

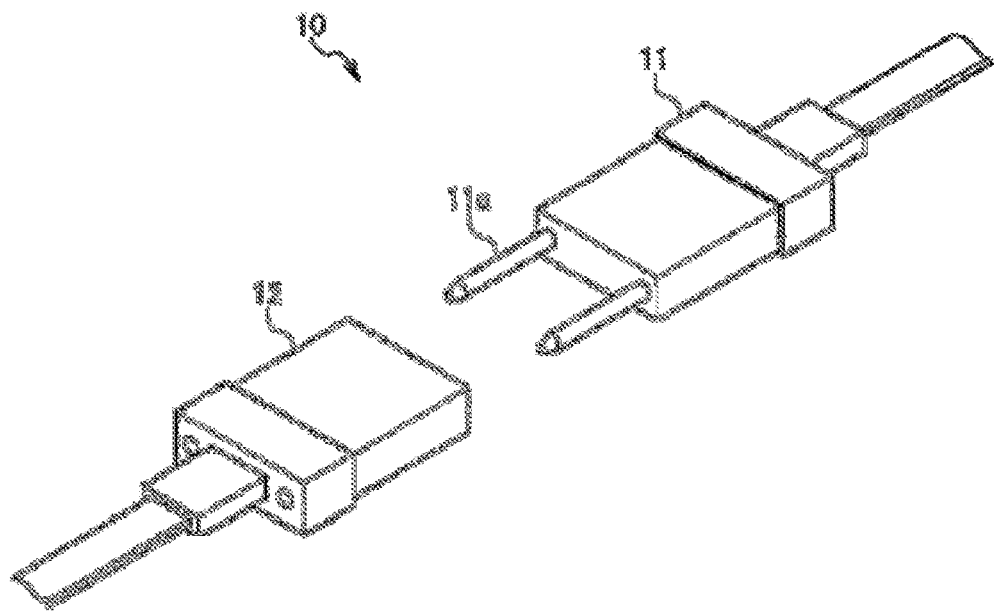

POLYARYLENE SULFIDE RESIN COMPOSITION AND USE OF SAME

TECHNICAL FIELD

The present invention relates to a polyarylene sulfide resin composition containing a polyarylene sulfide resin, more specifically to a polyarylene sulfide resin composition suitable for molding of an optical communication component of an opto-electronic related equipment, an optical communication equipment, etc., particularly for molding of an MT ferrule.

BACKGROUND ART

In recent years, in optical communication components, such as optical fiber connector ferrules or sleeves, etc., particularly MT ferrules, high dimensional stability (dimensional accuracy) is demanded in addition to mechanical strength. As resin compositions for molding of such an optical communication component, the present applicant has proposed a resin composition containing a polyarylene sulfide and silica particles having a low linear expansion coefficient (see, for example, PTL 1). According to this resin composition, it is possible to obtain high dimensional stability due to the silica particles contained in the resin composition in comparison with the conventional resin compositions.

CITATION LIST

Patent Literature

PTL 1: JP-A-2000-273304

SUMMARY OF INVENTION

Technical Problem

However, with respect to the conventional resin compositions, such as those in PTL 1, etc., particularly on the occasion of molding an MT ferrule for which high dimensional stability is demanded in addition to mechanical strength, there was sometimes found the case where if the content of silica contained in the resin composition is increased, a mold or a molding machine is worn away at the time of molding of a molded body.

Under these circumstances, the present invention has been made, and an object thereof is to provide a polyarylene sulfide resin composition which is good in strength, dimensional stability, and moldability in terms of a molded body thereof and is also capable of reducing wearing of a mold or a molding machine at the time of molding a molded body.

Solution to Problem

In order to solve the problem, the present inventors made extensive and intensive investigations. As a result, it has been found that when a glass bead whose average particle diameter and particle size distribution fall within specified ranges and a polyarylene sulfide resin are contained, a polyarylene sulfide resin composition having good moldability as well as good dimensional stability in terms of a molded body thereof can be realized, leading to accomplishment of the present invention. Specifically, the present invention is as follows.

1. A polyarylene sulfide resin composition containing 100 parts by mass of a polyarylene sulfide resin and 150 to 400 parts by mass of a glass bead, a sodium content of the polyarylene sulfide resin being 1,200 ppm or less, and the glass bead being surface-treated with a vinylsilane or an epoxysilane and having an average particle diameter of 30 µm or less and a ratio between a cumulative 10% particle diameter and a cumulative 90% particle diameter {(cumulative 90% particle diameter)/(cumulative 10% particle diameter)} of 2.5 or more.
2. The polyarylene sulfide resin composition as set forth in the above item 1, wherein the polyarylene sulfide resin is a linear type polyarylene sulfide resin.
3. The polyarylene sulfide resin composition as set forth in the above item 1 or 2, wherein the polyarylene sulfide resin composition is for optical communication components.
4. The polyarylene sulfide resin composition as set forth in any one of the above items 1 to 3, wherein the polyarylene sulfide resin composition is for MT ferrules.
5. A positioning tool prepared by molding the polyarylene sulfide resin composition as set forth in any one of the above items 1 to 4.
6. An optical communication component prepared by molding the polyarylene sulfide resin composition as set forth in any one of the above items 1 to 4.
7. An MT ferrule prepared by molding the polyarylene sulfide resin composition as set forth in any one of the above items 1 to 4.

Advantageous Effects of Invention

Under these circumstances, the present invention has been made and is able to realize a polyarylene sulfide resin composition which is good in strength, dimensional stability, and moldability in terms of a molded body thereof and is also capable of reducing wearing of a mold or a molding machine at the time of molding to obtain a molded body.

BRIEF DESCRIPTION OF DRAWINGS

FIG. 1 is a schematic perspective view of an MT ferrule according to an embodiment of the present invention.

DESCRIPTION OF EMBODIMENTS

Embodiments of the present invention are hereunder explained in detail. It is to be noted that in the following, for convenience of explanation, the "polyarylene sulfide resin composition" is also referred to simply as "resin composition", and the "polyarylene sulfide resin" is also referred to simply as "PAS".

<Polyarylene Sulfide Resin Composition>

The resin composition of the present invention contains 100 parts by mass of PAS and 150 to 400 parts by mass of a glass bead, a sodium content of PAS being 1,200 ppm or less, and the glass bead being surface-treated with a vinylsilane or an epoxysilane and having an average particle diameter of 30 µm or less and a ratio between a cumulative 10% particle diameter and a cumulative 90% particle diameter {(cumulative 90% particle diameter)/(cumulative 10% particle diameter)} of 2.5 or more.

According to this resin composition, the moisture absorption on the basis of sodium contained in PAS can be reduced, and therefore, it may be presumed that a hygroscopic expansion rate of a molded body can be reduced. In addition, an interaction at an interface between the surface-treated glass bead and PAS increases to thereby enhance the adhesive properties, and therefore, a dimensional change of the molded body at the time of moisture absorption can be reduced. In addition, the content, average particle diameter, and particle size distribution of the glass bead fall within appropriate ranges, and therefore, fluidity of PAS with excellent strength is not impaired, and wearing of a mold or a molding machine can be prevented from occurring. In view of these facts, even in the case of molding an optical communication connector, particularly a molded body for which accuracy of a μm unit is demanded as in MT ferrules, the resin composition which is good in strength, dimensional stability, and moldability in terms of a molded body thereof can be realized. Each of the components which are used for the resin composition of the present invention is hereunder explained in detail.

(Polyarylene Sulfide Resin)

PAS is preferably one having a constituent unit represented by the following formula (1).

—(Ar—S)—            (1)

(In the formula (1), Ar represents an arylene group, and S represents a sulfur atom.)

In the formula (1), in the case of defining the constituent unit (Ar—S) as one mole, a content of the instant constituent unit is preferably 50 mol % or more, more preferably 70 mol % or more, and yet more preferably 90 mol % or more.

In the formula (1), examples of the arylene group may include divalent aromatic residual groups containing at least one benzene ring, such as o-phenylene, m-phenylene, p-phenylene, C1-C6 alkyl-substituted phenylene, phenyl-substituted phenylene, halogen-substituted phenylene, amino-substituted phenylene, amide-substituted phenylene, p,p'-diphenylene sulfone, p,p'-biphenylene, p,p'-biphenylene ether, p,p'-biphenylene carbonyl, naphthalene, etc. Examples of such arylene group-containing PAS may include a homopolymer composed of the same constituent unit, a copolymer composed of two or more different arylene groups, and a mixture of a homopolymer and a copolymer.

In the PAS, polyphenylene sulfide containing p-phenylene sulfide as a main constituent unit (hereinafter also referred to as "PPS") is preferred from the viewpoints of excellent processability and also easiness of industrial availability. In addition, as for PPS, the constituent unit of p-phenylene sulfide is preferably 50 mol % or more, more preferably 80 mol % or more, yet more preferably 90 mol % or more, and particularly preferably substantially 100 mol % of the total of the constituent units. The terms "substantially 100 mol %" as referred to herein mean a range of, for example, 99.95 to 100 mol %. In addition, a polyarylene ketone sulfide, a polyarylene ketone ketone sulfide, and the like can also be used as PAS.

Examples of the copolymer may include random or block copolymers having a constituent unit of p-phenylene sulfide and a constituent unit of m-phenylene sulfide, random or block copolymers having a constituent unit of phenylene sulfide and a constituent unit of an arylene ketone sulfide, random or block copolymers having a constituent unit of phenylene sulfide and a constituent unit of an arylene ketone ketone sulfide, random or block copolymers having a constituent unit of phenylene sulfide and a constituent unit of arylene sulfone sulfide, and the like. Such PAS is preferably a crystalline polymer.

As for PAS, it is generally known that PAS of a linear molecular structure (hereinafter also referred to as "linear type PAS") and PAS of a molecular structure having a branched or crosslinked structure (hereinafter also referred to as "crosslinking type PAS") can be produced according to a production method. In the present invention, though all of the linear type PAS and the crosslinking type PAS can be used, the linear type PAS is preferred from the viewpoints of dimensional stability and moldability.

The linear type PAS can be, for example, produced by a known method of subjecting an alkali metal sulfide, such as sodium sulfide, etc., and a dihalogen-substituted aromatic compound, such as p-dichlorobenzene, etc., to a polymerization reaction in a polar solvent (see, for example, JP-A-2010-77347). In addition, the crosslinking type PAS can be produced by using a polyhalogen-substituted compound having 3 to 6 halogen substituents per molecule in combination in the production method of linear type PAS as described above. The polar solvent is preferably an aromatic organic amide solvent from the viewpoints that stability of the reaction system is high; and that a high-molecular weight polymer can be easily obtained.

A content of the residual halogen atom, such as a chlorine atom, etc., contained in PAS is preferably 4,500 ppm or less, and more preferably 1,500 ppm or less. When the content of the residual halogen atom is 4,500 ppm or less, the content of the halogen atom and the halogen compound in the resin composition can be made to be 1,000 ppm or less as converted into the halogen atom.

As for PAS, one in which a content of sodium remaining in PAS is 1,200 ppm or less is used. When the content of sodium is more than 1,200 ppm, a moisture absorption rate of the resin composition increases, resulting in deterioration of the dimensional stability of the molded body. From the viewpoints of a reduction of the moisture absorption rate of the resin composition and an enhancement of the dimensional stability of the molded body, the content of sodium is preferably 1,000 ppm or less, more preferably 800 ppm or less, yet more preferably 600 ppm or less, and still yet more preferably 400 ppm or less. In addition, from the viewpoint of reducing the content of sodium, it is preferred to use the linear type PAS as PPS.

A compounded amount of PAS is preferably 20 to 40 mass %, and more preferably 25 to 35 mass % relative to the total of the resin composition from the viewpoints of strength, dimensional stability, and moldability of the molded body.

(Glass Bead)

In the resin composition of the present invention, a content of the glass bead is 150 to 400 parts by mass based on 100 parts by mass of PAS. When the content of the glass bead is less than 150 parts by mass, a molding shrinkage rate and a linear expansion coefficient of the molded body increase, resulting in deterioration of the dimensional stability. When the content of the glass bead is more than 400 parts by mass, the fluidity of the resin composition and the strength of the molded body are lowered, and the wearing properties of the molded body and the mold increase, resulting in deterioration of the moldability. The content of the glass bead is preferably 150 to 350 parts by mass, more preferably 150 to 300 parts by mass, and still more preferably 200 to 300 parts by mass based on 100 parts by mass of PAS from the viewpoints of strength, dimensional stability, and moldability of the molded body.

In the resin composition of the present invention, an average particle diameter of the glass bead is 30 μm or less. When the average particle diameter of the glass bead is more than 30 μm, not only the strength of the molded body is lowered, but also the dimensional accuracy of the molded body in a unit of several μm or less is lowered. The average particle diameter of the glass bead is preferably 1 to 25 μm, more preferably 3 to 20 μm, and still more preferably 5 to 15 μm from the viewpoint of prevention of defective biting at the time of kneading to be caused due to a lowering of fluidity of the resin composition, the viewpoint of an enhancement of strength of the molded body, and the viewpoint of an enhancement of dimensional accuracy of the molded body in a unit of several μm or less.

In the resin composition of the present invention, the particle size distribution of the glass bead is 2.5 or more. It is to be noted that the "particle size distribution" as referred to herein is a ratio between a cumulative 10% particle diameter and a cumulative 90% particle diameter {(cumulative 90% particle diameter)/(cumulative 10% particle diameter)} of the glass bead. When the particle size distribution is less than 2.5, there may be the case where the fluidity of the resin composition is impaired, resulting in deterioration of the moldability, and there is also a concern that an aggregate is formed at the time of surface-treating the glass bead. In particular, in the case where an incorporating amount of the glass bead is large, a lowering of fluidity of the resin composition becomes remarkable, resulting in deterioration of the moldability of the molded body. In addition, when the particle size distribution is more than 20, a component having an extremely small particle diameter, or conversely a component having an extremely large particle diameter is incorporated, so that there is a concern that defective biting at the time of kneading the resin composition occurs, or the dimensional accuracy of the molded body is lowered. From the viewpoints, the particle size distribution of the glass bead is preferably 2.5 to 20, more preferably 2.5 to 10, yet more preferably 3.0 to 7.0, and still yet more preferably 3.0 to 5.0.

It is to be noted that the "average particle diameter" as referred to in the present invention is a value measured by means of the laser diffraction method. The "cumulative 10% particle diameter" as referred to herein represents a particle diameter corresponding to 10% of particles cumulated from the smaller side of an integrated quantity in a cumulative particle-size distribution curve on the volume basis when measured by means of the laser diffraction method. Similarly, the "cumulative 90% particle diameter" as referred to herein represents a particle diameter corresponding to 90% of particles cumulated from the smaller side of the integrated quantity.

As for the glass bead, a glass bead surface-treated with a vinylsilane or an epoxysilane is used. According to this surface treatment, since an interaction at an interface between the glass bead and PAS is increased, the adhesive properties between the glass bead and PAS are enhanced. According to this enhancement of adhesive properties, at the time of molding of not only a general optical communication component but also an MT ferrule, falling of the glass bead from the gate cross section or polished surface of the molded body can be prevented from occurring. In consequence, an enhancement of strength of the molded body, and a reduction of dimensional change of the molded body at the time of an increase of moisture absorption rate and moisture absorption of the molded body, can be realized. Moreover, a resin composition which is especially suitably usable for molding of an MT ferrule, while reducing wearing of a mold or a molding machine at the time of molding of a molded body, can be realized.

As for the glass bead, a glass bead surface-treated with a vinylsilane or an epoxysilane of every sort within the range where the effects of the present invention are brought can be used. However, from the viewpoint of more reducing a hygroscopic expansion rate, a glass bead surface-treated with a vinylsilane is preferred, and a glass bead which is treated with an acrylic silane among vinylsilanes is more preferred.

As for a surface treating agent which is used for the surface treatment of the glass bead, besides the vinylsilane including the acrylic silane and the epoxysilane as described above, aminosilane, ureide-modified aminosilane, glycidyl silane, chlorosilane, mercapto silane, peroxysilane, or the like may also be used in combination.

As for the glass bead, various glass beads can be used within the range where the effects of the present invention are brought, and for example, a soda-lime glass bead, a borosilicate glass bead, a potassium glass bead, a quartz glass bead, and the like can be used. Among these, a soda-lime glass bead and a borosilicate glass bead are preferred from the viewpoint that they are economically inexpensive and the viewpoint that they are relatively low in hardness among various glass beads, so that they are low in possibility of damaging other members coming into contact with the molded body of the resin composition. In addition, a borosilicate glass bead is more preferred from the viewpoints of low hygroscopicity and excellent dimensional stability of the molded body. It is to be noted that commercially available borosilicate glass beads (trade names: UB-02E and UBS-0020E, all of which are manufactured by Unitika Ltd.) may also be used as the glass bead.

A compounded amount of the glass bead is preferably 60 to 80 mass %, and more preferably 65 to 75 mass % relative to the total of the resin composition from the viewpoints of strength, dimensional stability, and moldability of the molded body.

In the resin composition of the present invention, other components than the above-described components may be contained within the range where the effects of the present invention are brought. Examples of the other components include various additives, such as an antioxidant, an ultraviolet ray absorber, a weathering agent, a lubricating agent, a plasticizer, an antistatic agent, a coloring agent, a release agent, etc.; thermoplastic resins or thermosetting resins, such as a polyamide, an epoxy resin, a polyolefin, a polyether sulfone, a polyphenylene ether, etc.; rubbers, such as hydrogenated SBS (hydrogenated styrene-butadiene-styrene block copolymer), hydrogenated NBR (hydrogenated acrylonitrile butadiene rubber), silicone rubber, fluorine rubber, etc.; pigments; fibrous reinforcing agents, such as a glass fiber, a carbon fiber, an aluminum borate whisker, a zinc oxide whisker, a calcium silicate whisker, a calcium carbonate whisker, a potassium titanium whisker, a silicon carbide whisker, etc.; inorganic fillers, such as barium sulfate, calcium sulfate, kaolin, clay, pyrophyllite, bentonite, sericite, zeolite, mica, isinglass, silica, talc, wollastonite, a glass bead, a carbon bead, etc.; and the like.

[Production Method of Resin Composition]

Next, a production method of the resin composition of the present invention is explained.

Examples of the production method of the resin composition of the present invention include a method in which a glass bead and optionally various additives are added to PAS, the contents are uniformly mixed by a mixing machine, such as a tumbler, a Henschel mixer, etc., and the mixture is then melt kneaded at 250 to 380° C. by a single-screw extruder, a twin-screw extruder, or the like. It is to be noted that the production method of the resin composition should not be construed to be limited to the above-described production method.

In the resin composition of the present invention, a spiral flow length (SFL) is 60 to 300 mm. In addition, the molded body obtained by means of injection molding of the resin composition, or the like has a bending strength of 90 MPa or more. An Izod impact strength (unnotched) thereof is 7.0 kJ/m² or more. A molding shrinkage rate thereof is 1.00 or more in the MD direction and 1.00 or more in the TD direction, respectively, with MD/TD being 0.90 to 1.10. A linear expansion coefficient thereof is 3.00 or less in the MD direction and 3.00 or less in the TD direction, respectively, with MD/TD being 0.90 to 1.10. In addition, a weight increase rate thereof after a pressure cooker test for 200 hours is 0.3 or less, and a hygroscopic expansion rate thereof is 0.4 or less. In addition, a missing amount of the filler is 50 or less per 0.1 mm².

<Molded Body>

The resin composition of the present invention can be suitably used for molding of an optical communication component for opto-electronic related equipment, optical communication equipment, an MT (mechanically transferable) connector, etc., and a positioning tools. Among these, the resin composition of the present invention can be suitably used as a resin composition for an optical communication component, particularly for an MT ferrule.

FIG. 1 is a schematic perspective view showing an MT ferrule molded using the resin composition of the present invention. As shown in FIG. 1, this MT ferrule 10 is provided with a measuring instrument side connector 11 and a measuring circuit side connector 12, each of which is molded of the resin composition of the present invention. The measuring instrument side connector 11 is provided with fitting pins 11a, and the fitting pins 11a are inserted into insert holes (not illustrated) of the measuring circuit side connector 12, whereby the connector 11 is fitted to the connector 12. Since this MT ferrule 10 is molded of the resin composition of the present invention, the wearing of a mold at the time of molding of the measuring instrument side connector 11 and the measuring circuit side connector 12, the wearing of the connectors 11 and 12 per se after molding, or the like, can be reduced. In addition, since the measuring instrument side connector 11 and the measuring circuit side connector 12 are excellent in dimensional stability, a positioning accuracy on the occasion of fitting the measuring instrument side connector 11 and the measuring circuit side connector 12 to each other by using a positioning tool for MT ferrule (not illustrated) becomes good.

Examples of a molding method of the molded body include a molding method of subjecting the resin composition to injection molding by an injection molding machine (trade name: SE18DUZ, manufactured by Sumitomo Heavy Industries, Ltd.). In this case, the molded body is obtained by, for example, carrying out injection molding under a condition satisfying the ranges of a molding temperature of 290° C. to 380° C. and a mold temperature of 120° C. to 160° C.

EXAMPLES

The present invention is hereunder explained in more detail on the basis of Examples and Comparative Examples which were carried out for the purpose of clarifying the effects of the present invention. It is to be noted that the present invention should be construed to be not limited to the following Examples and Comparative Examples at all.

[Measuring Method of Average Particle Diameter]

The average particle diameter was measured using a laser particle size distribution measuring instrument (Model Number: LA920, manufactured by Horiba, Ltd.).

[Calculation Method of Particle Size Distribution]

In a cumulative particle-size distribution curve on the volume basis as obtained by the measurement of an average particle diameter, when particle diameters corresponding to 10% and 90% of particles cumulated from the smaller side of an integrated quantity thereof were defined as a cumulative 10% particle diameter and a cumulative 90% particle diameter, respectively, the particle size distribution was calculated in terms of a ratio thereof {(cumulative 10% particle diameter)/(cumulative 90% particle diameter)}.

[Measurement of Sodium Content]

After ashing by the dry ashing method, the sodium content was determined by the measurement by means of an ICP (inductively coupled plasma) emission spectro-photometric analysis method.

[Evaluation Methods of Characteristics]

(1) Measurement of Spiral Flow Length [SFL]:

On the occasion of injection molding at a cylinder temperature of 320° C. and a mold temperature of 135° C., and at an injection pressure of 100 MPa, a length flowing through a groove having a thickness of 1 mm and a width of 10 mm was measured. The evaluation criteria are shown below.

A: 100 mm or more
B: 60 mm or more and less than 100 mm
C: Less than 60 mm (2) Measurement of Bending Strength (MPa):

The bending strength was measured in conformity with ASTM D790. The evaluation criteria are shown below.

A: 95 MPa or more
B: 90 MPa or more and less than 95 MPa
C: Less than 90 MPa (3) Izod Impact Strength (kJ/m²)—Unnotched:

The Izod impact strength was measured in conformity with ASTM D256.

A: 7.5 kJ/m² or more
B: 7.0 kJ/m² or more and less than 7.5 kJ/m²
C: Less than 7.0 kJ/m²

(4) Measurement of Molding Shrinkage Rate:

A flat board of 80×80×3.2 mm was molded under a condition at a cylinder temperature of 320° C. and a mold temperature of 135° C., and the molding shrinkage rate in each of the MD direction and the TD direction was measured using a measuring microscope. The evaluation criteria are shown below. It is to be noted that as for the evaluation, the case where the molding shrinkage rate is graded as "C" in any one of those in the MD direction and the TD direction and MD/TD is judged as "C" as a whole.

(MD Direction and TD Direction)

A: 0.80 or less
B: 1.00 or less and more than 0.80
C: More than 1.00

(MD/TD)

A: 0.90 or more and 1.00 or less
B: 0.80 or more and less than 0.90, or more than 1.00 and 1.10 or less
C: Less than 0.80 or more than 1.10

(5) Measurement of Linear Expansion Coefficient:

The linear expansion coefficient was measured in conformity with ASTM D256. The evaluation criteria are shown below. It is to be noted that as for the evaluation, the case where the linear expansion coefficient is graded as "C" in any one of those in the MD direction and the TD direction and MD/TD is judged as "C" as a whole.

(MD Direction and TD Direction)

A: 2.50 or less
B: More than 2.50 and 3.00 or less
C: More than 3.00

(MD/TD)

A: 0.90 or more and 1.00 or less

B: 0.80 or more and less than 0.90, or more than 1.00 and 1.10 or less

C: Less than 0.80 or more than 1.10

(6) Measurement of Mass Increase Rate by Water Absorption:

After carrying out the pressure cooker test using a bending bar in conformity with ASTM at 121° C. and 2 atms for 100 hours, a change rate relative to the initial mass was measured. The evaluation criteria are shown below.

A: 0.2 mass % or less

B: More than 0.2 mass % and 0.3 mass % or less

C: More than 0.3 mass %

(7) Hygroscopic Expansion Rate:

After carrying out the pressure cooker test using a bending bar in conformity with ASTM at 121° C. and 2 atms for 100 hours, a change rate relative to the initial dimensions (length×width×thickness) was measured. The evaluation criteria are shown below.

A: 0.3 mass % or less

B: More than 0.3 mass % and 0.4 mass % or less

C: More than 0.4 mass %

(8) Examination of Missing Number of Filler:

A cylindrical sample having a diameter of 32 mm was obtained by carrying out injection molding at a cylinder temperature of 320° C. and a mold temperature of 135° C. Using this cylindrical sample, the missing number of the filler (including cracks) per 0.1 mm$^2$ on the polished surface of the molded body was measured in the following manner.

An alumina polishing powder having a diameter of 50 μm was dispersed on a disk having a diameter of 8 inches at 120 rpm, three of the cylindrical samples having a diameter of 32 mm were placed thereon, and polishing was carried out while applying a load of 12 lb (≅53.3 N). The polished samples were observed by a laser microscope ("OPTELICS H1200", manufactured by Lasertec Corporation), and the falling number of the filler and cracks within a visual field of 0.1 mm$^2$ were measured through visual inspection. The evaluation criteria are shown below.

A: 20 or less

B: More than 20 and 40 or less

C: More than 40

Examples 1 to 6 and Comparative Examples 1 to 7

The respective components were uniformly mixed in compounded amounts (unit: parts by mass) shown in each of Tables 2 and 3 by using a Henschel mixer, and the mixture was melt kneaded at a cylinder temperature 320° C. by using a twin-screw extruder "TEM37" (manufactured by Toshiba Machine Co., Ltd.), thereby producing a pellet. Using the pellet, the characteristics of the molded body were evaluated according to the evaluation methods of characteristics as described above. The results are shown in Tables 2 and 3.

The various components used in the Examples and Comparative Examples are hereunder described.

PPS-1: Linear type PPS, sodium content: 400 ppm

PPS-2: Crosslinking type PPS, sodium content: 1,300 ppm

Glass bead-1: UB-02E, AC: surface-treated with acrylic silane, average particle diameter: 20 μm, particle size distribution: 4.0

Glass bead-2: UB-02E, G: surface-treated with epoxy silane, average particle diameter: 20 μm, particle size distribution: 4.0

Glass bead-3: UBS-0020E, AC: surface-treated with acrylic silane, average particle diameter: 12 μm, particle size distribution: 2.4

Glass bead-4: Product of special specifications, surface-treated with acrylic silane, average particle diameter: 32 μm, particle size distribution: 4.0

Glass bead-5: UBS-0005E, AC: surface-treated with acrylic silane, average particle diameter: 4 μm, particle size distribution: 2.0

Glass bead-6: UB-02E, not surface-treated, average particle diameter: 20 μm, particle size distribution: 4.0

Silica: FS-74, surface-treated with epoxy silane, average particle diameter: 15 μm, particle size distribution: 24

TABLE 1

| Filler properties | Surface treatment | Average particle diameter (μm) | Particle size distribution |
|---|---|---|---|
| Glass bead-1 | Acrylic silane | 20 | 4.0 |
| Glass bead-2 | Epoxy silane | 20 | 4.0 |
| Glass bead-3 | Acrylic silane | 12 | 2.5 |
| Glass bead-4 | Acrylic silane | 32 | 4.0 |
| Glass bead-5 | Acrylic silane | 4 | 2.0 |
| Glass bead-6 | No | 20 | 4.0 |
| Silica | Epoxy silane | 15 | 24 |

TABLE 2

| | Example | | | | | |
|---|---|---|---|---|---|---|
| | 1 | 2 | 3 | 4 | 5 | 6 |
| PPS-1 | 100 | 100 | 100 | 100 | 100 | 100 |
| PPS-2 | | | | | | |
| Glass bead-1 | 150 | 200 | 300 | 400 | | |
| Glass bead-2 | | | | | 200 | |
| Glass bead-3 | | | | | | 300 |
| Glass bead-4 | | | | | | |
| Glass bead-5 | | | | | | |
| Glass bead-6 | | | | | | |
| Silica | | | | | | |
| Fluidity | 205 | 138 | 98 | 80 | 139 | 92 |
| | (A) | (A) | (B) | (B) | (A) | (B) |
| Bending strength | 100 | 94 | 91 | 91 | 99 | 99 |
| | (A) | (B) | (B) | (B) | (A) | (A) |
| Izod impact strength | 8.2 | 7.5 | 7.1 | 7.1 | 7.9 | 7.0 |
| | (A) | (A) | (B) | (B) | (A) | (B) |

TABLE 2-continued

|  |  | Example |  |  |  |  |  |
|---|---|---|---|---|---|---|---|
|  |  | 1 | 2 | 3 | 4 | 5 | 6 |
| Molding shrinkage rate | MD | 0.79 (A) | 0.62 (A) | 0.51 (A) | 0.45 (A) | 0.61 (A) | 0.54 (A) |
|  | TD | 0.73 (A) | 0.58 (A) | 0.62 (A) | 0.51 (A) | 0.59 (A) | 0.64 (A) |
|  | MD/TD | 1.08 (B) | 1.07 (B) | 0.82 (B) | 0.88 (B) | 1.03 (B) | 0.83 (B) |
| Linear expansion coefficient | MD | 2.89 (B) | 2.27 (A) | 1.96 (A) | 1.75 (A) | 2.22 (A) | 2.01 (A) |
|  | TD | 2.69 (B) | 2.22 (A) | 1.91 (A) | 1.67 (A) | 2.12 (A) | 1.94 (A) |
|  | MD/TD | 1.07 (B) | 1.02 (B) | 1.02 (B) | 1.05 (B) | 1.05 (B) | 1.04 (B) |
| Weight increase rate (%) |  | 0.24 (B) | 0.24 (B) | 0.21 (B) | 0.19 (A) | 0.27 (B) | 0.21 (B) |
| Hygroscopic expansion rate (%) |  | 0.29 (A) | 0.3 (A) | 0.35 (B) | 0.37 (B) | 0.39 (B) | 0.36 (B) |
| Missing number of filler (per 0.1 mm$^2$) |  | 12 (A) | 13 (A) | 14 (A) | 15 (A) | 12 (A) | 13 (A) |

TABLE 3

|  |  | Comparative Example |  |  |  |  |  |  |
|---|---|---|---|---|---|---|---|---|
|  |  | 1 | 2 | 3 | 4 | 5 | 6 | 7 |
| PPS-1 |  | 100 | 100 |  | 100 | 100 | 100 | 100 |
| PPS-2 |  |  |  | 100 |  |  |  |  |
| Glass bead-1 |  |  | 100 | 550 | 300 |  |  |  |
| Glass bead-2 |  |  |  |  |  |  |  |  |
| Glass bead-3 |  |  |  |  |  |  |  |  |
| Glass bead-4 |  |  |  |  | 300 |  |  |  |
| Glass bead-5 |  |  |  |  |  | 300 |  |  |
| Glass bead-6 |  |  |  |  |  |  | 400 |  |
| Silica |  |  |  |  |  |  |  | 230 |
| Fluidity |  | 270 (A) | 56 (C) | 100 (A) | 99 (B) | — | 90 (B) | 99 (B) |
| Bending strength |  | 106 (A) | 89 (B) | 88 (B) | 85 (B) | — | 82 (B) | 130 (A) |
| Izod impact strength |  | 8.9 (A) | 6.8 (C) | 6.3 (C) | 6.7 (C) | — | 6.8 (C) | 11.1 (A) |
| Molding shrinkage rate | MD | 0.99 (B) | 0.36 (A) | 0.52 (A) | 0.49 (A) | — | 0.51 (A) | 0.47 (A) |
|  | TD | 1.04 (C) | 0.44 (A) | 0.63 (A) | 0.52 (A) | — | 0.49 (A) | 0.41 (A) |
|  | MD/TD | 0.83 (B) | 0.83 (B) | 0.83 (B) | 0.94 (B) | — | 1.04 (B) | 1.15 (C) |
| Linear expansion coefficient | MD | 3.26 (C) | 1.5 (A) | 1.97 (A) | 1.98 (A) | — | 1.8 (A) | 1.79 (A) |
|  | TD | 3.13 (C) | 1.43 (A) | 1.92 (A) | 1.96 (A) | — | 1.74 (A) | 1.69 (A) |
|  | MD/TD | 1.04 (B) | 1.04 (B) | 1.02 (B) | 1.01 (B) | — | 1.03 (B) | 1.06 (B) |
| Weight increase rate (%) |  | — | — | 0.3 (B) | — | — | — | 0.29 (A) |
| Hygroscopic expansion rate (%) |  | — | — | 0.56 (C) | — | — | — | 0.34 (B) |
| Missing number of filler (per 0.1 mm$^2$) |  | — | — | 24 (B) | — | — | — | 44 (C) |

In Comparative Example 5, it was impossible to achieve molding due to a feed-neck phenomenon.

As is clear from Tables 2 and 3, it is understood that in the resin composition containing the glass bead in an amount falling within a prescribed range relative to the polyarylene sulfide, in which the glass bead has an average particle diameter of 30 μm or less and a particle size distribution of 2.5 or more, good evaluation results in all of the fluidity of the resin composition, strength, the weight increase rate, and hygroscopic expansion rate and the missing of the filler of the molded body, are obtained.

In contrast, it is understood that in the case where the content of the glass bead is too small, the molding shrinkage rate and linear expansion coefficient are deteriorated, resulting in a lowering of the dimensional stability (Comparative Example 1). In addition, it is understood that in the case where the content of the glass bead is too large, the fluidity of the resin composition is deteriorated, resulting in a lowering of the moldability (Comparative Example 2). In addition, it is understood that in the case where the sodium content of PAS is large, the hygroscopic expansion rate increases, resulting in a lowering of the dimensional stability of the molded body at the time of moisture absorption (Comparative Example 3). Furthermore, it is understood that in the case where the average particle diameter of the glass bead is too large, the strength of the molded body is deteriorated (Comparative Example 4). Moreover, it is understood that in the case where the particle size distribution of the glass bead is too small, a feed-neck phenomenon is generated to make it impossible to achieve molding of the resin composition, resulting in remarkable deterioration of the moldability (Comparative Example 5). In addition, it is understood that in the case where the glass bead is not subjected to the surface treatment, the strength is deteriorated (Comparative Example 6). Furthermore, it is understood that in the case of using silica but not the glass bead, missing of the filler largely increases, resulting in a lowering of the moldability (Comparative Example 7).

INDUSTRIAL APPLICABILITY

In the light of the above, the present invention has an effect for making it possible to realize a resin composition which is good in strength, dimensional stability, and moldability in terms of a molded body thereof and is also capable of reducing wearing of a mold or a molding machine at the time of molding of a molded body. The resin composition of the present invention can be suitably used for molding of an optical communication component, for opto-electronic related equipment, optical communication equipment, etc., and electrical and electronic related equipment, more specifically an image sensor component, an optical fiber connector ferrule, a sleeve, and the like and can be particularly suitably used as a resin composition for molding of an MT ferrule.

REFERENCE SIGNS LIST

10: MT ferrule
11: Measuring instrument side connector
11a: Fitting pin
12: Measuring circuit side connector

The invention claimed is:

1. A polyarylene sulfide resin composition comprising 100 parts by mass of a polyarylene sulfide resin and 150 to 400 parts by mass of borosilicate glass beads,
   a sodium content of the polyarylene sulfide resin being 1,200 ppm or less, and
   the borosilicate glass beads being surface-treated with a vinylsilane and having an average particle diameter of 3 to 20 μm and a ratio between a cumulative 10% particle diameter and a cumulative 90% particle diameter {(cumulative 90% particle diameter)/(cumulative 10% particle diameter)} of the range of 2.5 to 10.

2. The polyarylene sulfide resin composition according to claim 1, wherein the polyarylene sulfide resin is a linear type polyarylene sulfide resin.

3. The polyarylene sulfide resin composition according to claim 1, wherein the polyarylene sulfide resin composition is for optical communication components.

4. The polyarylene sulfide resin composition according to claim 1, wherein the polyarylene sulfide resin composition is for MT ferrules.

5. A positioning tool prepared by molding the polyarylene sulfide resin composition according to claim 1.

6. An optical communication component prepared by molding the polyarylene sulfide resin composition according to claim 1.

7. An MT ferrule prepared by molding the polyarylene sulfide resin composition according to claim 1.

8. The polyarylene sulfide resin composition according to claim 1, wherein the polyarylene sulfide resin contains p-phenylene sulfide as a constituent unit, and the constituent unit of p-phenylene sulfide is 50% or more of the total of the constituent units.

9. The polyarylene sulfide resin composition according to claim 1, wherein a compounded amount of the polyarylene sulfide resin is 20 to 40 mass % relative to the total of the resin composition.

10. The polyarylene sulfide resin composition according to claim 1, wherein the borosilicate glass beads are surface-treated with an acrylic silane.

11. The polyarylene sulfide resin composition according to claim 1, wherein a compounded amount of the borosilicate glass bead is 60 to 80 mass % relative to the total of the resin composition.

12. The polyarylene sulfide resin composition according to claim 1, wherein a spiral flow length of the polyarylene sulfide resin composition is 60 to 300 mm.

13. A molded body prepared by molding the polyarylene sulfide resin composition according to claim 1.

14. The molded body according to claim 13, wherein the molded body has a bending strength of 90 MPa or more.

15. The molded body according to claim 13, wherein an Izod impact strength (unnotched) of the molded body is 7.0 kJ/m$^2$ or more.

16. The molded body according to claim 13, wherein a molding shrinkage rate of the molded body is 1.00 or more in the MD direction, and 1.00 or more in the TD direction, with MD/TD being 0.90 to 1.10.

17. The molded body according to claim 13, wherein a linear expansion coefficient of the molded body is 3.00 or less in the TD direction, and 3.00 or less in the TD direction, with MD/TD being 0.90 to 1.10.

18. The molded body according to claim 13, wherein a weight increase rate of the molded body after a pressure cooker test for 200 hours is 0.3 or less.

* * * * *